(12) United States Patent
Zetterberg

(10) Patent No.: US 8,139,726 B1
(45) Date of Patent: Mar. 20, 2012

(54) VOICEMAIL SYSTEM AND METHOD FOR PROVIDING VOICEMAIL TO TEXT MESSAGE CONVERSION

(75) Inventor: Carl Peter Zetterberg, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1101 days.

(21) Appl. No.: 11/954,267

(22) Filed: Dec. 12, 2007

(51) Int. Cl.
*H04M 11/00* (2006.01)

(52) U.S. Cl. .................................. 379/88.14; 379/88.25

(58) Field of Classification Search .... 379/88.13–88.14, 379/88.23–88.25
See application file for complete search history.

(56) References Cited

U.S. PATENT DOCUMENTS

| | | | |
|---|---|---|---|
| 6,366,651 B1 * | 4/2002 | Griffith et al. ............. | 379/88.14 |
| 6,483,899 B2 * | 11/2002 | Agraharam et al. ....... | 379/88.14 |
| 6,507,643 B1 | 1/2003 | Groner | |
| 6,625,142 B1 * | 9/2003 | Joffe et al. .................... | 370/356 |
| 7,136,462 B2 * | 11/2006 | Pelaez et al. ............... | 379/88.14 |
| 7,164,753 B2 * | 1/2007 | Engelke et al. ........... | 379/88.01 |
| 7,257,202 B2 * | 8/2007 | Umemura et al. ......... | 379/88.14 |

* cited by examiner

*Primary Examiner* — Simon Sing
(74) *Attorney, Agent, or Firm* — Parks IP Law LLC; Mikki D. Murray, Esq.

(57) ABSTRACT

A method and system for allowing a calling party to send a voicemail message as a text message. A calling party leaves a voicemail message and that message is converted from voice to a text message. If the calling party wishes to confirm the conversion, the text message is then converted to a voicemail message. The converted voicemail message is presented to the calling party so that the calling party can review and edit the message. The calling party can review and edit any portion of the converted voicemail message. The edits of the voicemail message are applied and the voicemail message is converted to a new text message. If the calling party wishes to further review and edit the text message, it is converted to a new voicemail; otherwise the text message is sent to the called party.

20 Claims, 3 Drawing Sheets

VOICEMAIL SYSTEM AND METHOD FOR PROVIDING VOICEMAIL TO TEXT MESSAGE CONVERSION

TECHNICAL FIELD

The present invention relates generally to voicemail systems and, more particularly, to a voicemail system and method for providing voicemail to text message conversion.

BACKGROUND

Text messaging, such as Short Message Service (SMS) messaging, is a popular mode of communication. To send an SMS message a user composes a text message by typing a short message into a computer, cell phone, or other compatible electronic device. After the user composes the message and presses a "send" key, the resulting message is sent to an SMS message center or SMSC. The SMSC forwards the short message to the destination computer, cell phone, or other device capable of receiving and displaying the message. The destination device generally receives the message a short time thereafter.

Voicemail is another popular messaging service. Voicemail messages allow a calling party to leave a message that is stored in a virtual mailbox designated for the unavailable or unresponsive called party. The called party can retrieve his/her voicemail messages by dialing into the voicemail system.

Text messaging allows a called party to receive messages without having to connect to a voicemail system. For some people, such as those with disabilities or physical impairments, text messaging is not possible or convenient. Although users can send and receive messages quickly with text messaging, text messaging can be dangerous at times, for example, while driving. Voicemail allows a calling party to send a message when it is inconvenient or impossible to type a message.

Current technology, such as speech recognition and speech synthesis, attempts to bridge the gap between voicemail messages and text messages. Products are known in the art that use speech recognition and speech synthesis to send voicemail messages as text to wireless devices. Speech recognition translates spoken words into text. Conversely, speech synthesis presents text as speech. While speech recognition has improved significantly, the technology is not without its deficiencies. Individual speech patterns, language differences, dialects, and accents, among other things, make achieving accurate and precise speech translation difficult. When speech recognition is paired with speech synthesis, the probability of the resulting message being different from the original message increases dramatically.

Therefore, assuming an increase in the availability and use of voicemail to text message services results in a need for systems and methods that provide confirmation functions to ensure the correct intended text message is sent to a called party.

SUMMARY

The systems and methods described herein allow a calling party to confirm a voicemail message after it is translated to text and before it is sent to the called party. An exemplary voice-to-text message system can include at least one communications device configured to function with a messaging application; the messaging application can be, for example, an Instant Messaging (IM) application, a Short Message Service (SMS) application, or an Enhanced Message Service (EMS). The voice-to-text message system can also include a dialog manager, a speech recognition system, and a speech synthesis system. The dialog manager can be configured to allow the calling party to review and edit a converted voicemail message.

An exemplary method for using the voice-to-text message system includes a calling party recording a voicemail message for a called party. The voicemail message is converted to a text message and the text message is then converted to voice and presented to the calling party. After the message is translated and presented, the calling party is given an option to confirm or edit the voicemail message. Upon receipt of a request to edit the voicemail message, means for editing the voicemail message, such as, but not limited to, verbal edits or edits using a user interface are provided by the system. An edited voicemail message is thereafter generated. The edited voicemail message can include at least one edited portion of the voicemail message initially played to the calling party.

The method is repeated when the calling party has finished making edits. The edited voicemail message is converted to a new text message and the new text message is converted to voice and presented to the calling party. The converted voicemail message that is presented to the calling party can include at least the edited portion of the message. The calling party is given the option again to confirm or edit the voicemail message. The calling party can edit until the message is correct. When the calling party is satisfied, a confirmation is sent by the calling party and the edited text message is sent to the called party. Alternatively, the resulting text message may be sent to both the called party and the calling party once the message is confirmed by the calling party.

The present invention allows the calling party to repeatedly review and edit their message prior to sending it to a called party. The calling party can review the edited portions of the message only, the entire message, or any combination of selected words surrounding the edited portions.

DETAILED DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
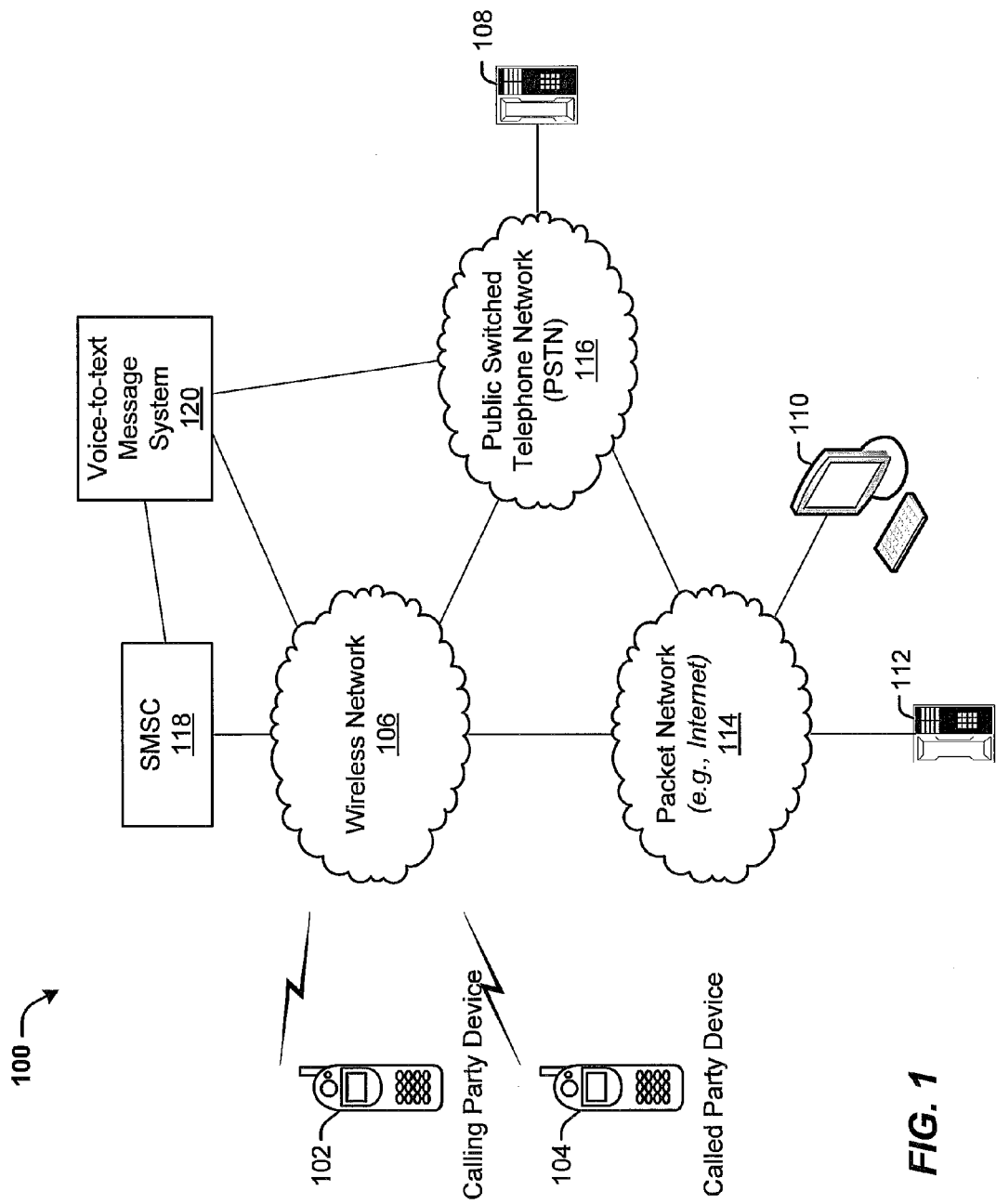
FIG. 1 is a block diagram illustrating an embodiment of a communications system for providing voicemail to text message conversion.

Referring now to the drawings, wherein like numerals represent like elements throughout the several views, FIG. 1 depicts an exemplary communications system 100, according to the present invention. The illustrated system 100 includes a calling party device 102 and a called party device 104 in communication with a wireless network 106. The wireless network 106 can be based on, for example, GSM, UMTS, TDMA, and CDMA, although alternative networks are contemplated. Although the illustrated embodiment depicts the calling and called party devices 102, 104 as mobile phones, the calling party and the called party may be alternatively be associated with a landline device 108, a computer 110, a Voice over Internet Protocol (VoIP) device 112, any device capable of receiving text, combinations thereof, and the like. These alternative devices are illustrated as being in communication with a packet network (e.g., the Internet) 114 or a public switched telephone network (PSTN) 116.

The wireless network 106 is in communication with a Short Message Service center (SMSC) 118. The SMSC 118 functions to receive SMS messages from a source device and forward the SMS messages to a destination device. The SMSC 118 is also in communication with a voice-to-text message system 120, which is itself in communication with other networks 106, 114, 116.

The voice-to-text message system 120 converts voicemail messages to text messages and allows a calling party to review, edit, and review at least the edited portion of a message prior to confirming the message for transmission. The voice-to-text message system 120 sends converted messages to the SMSC 118, which receives the converted messages and forwards the messages to the appropriate called party (destination) device.

An exemplary call scenario is now described. A call is placed from the calling party device 102 and routed through the wireless network 106. If the calling party device 102 does not establish a connection with the called party, the calling party is connected to the voice-to-text message system 120. The voice-to-text message system 120 presents a voicemail greeting to the calling party and prompts the calling party to leave a voicemail message. If the calling party chooses to leave a voicemail message they remain connected to the voice-to-text message system 120 and an indicator notifies the calling party to begin recording a voicemail message, which is generally a short, timed message. The calling party may review the voicemail message before requesting it be sent to the called party. In an exemplary embodiment, the voice-to-text message system 120 prompts the calling party to determine, whether the voicemail message should be stored as a voicemail message or sent as a text message to the called party. If the calling party selects the voicemail message is to be stored as a voicemail message, then the recorded message is stored in the voice-to-text message system 120 for later retrieval by the called party. However, if the calling party elects to have the voicemail message sent as a text message, the voicemail message is converted to a text message and transmitted (pending any edit and/or review process) via a protocol to the SMSC 118. One such protocol generally used, by way of example and not limitation, is short message peer to peer messaging protocol (SMPP). The SMSC 118 receives and stores the text message and eventually forwards the text message to the called party when the called party's device 104 is available. In alternate embodiments, a voicemail message may be initiated from a landline device 108, a computer 110, or a VoIP device 112.

Figure 2:
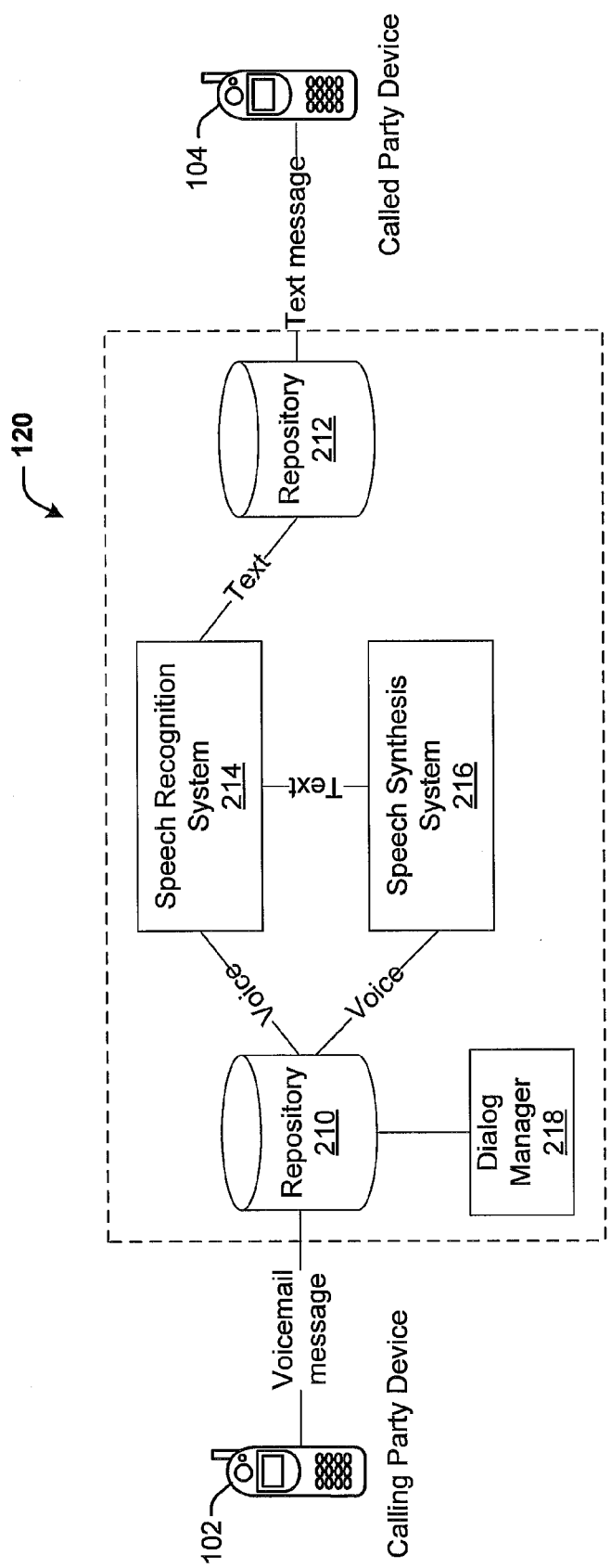
FIG. 2 is a block diagram illustrating an embodiment of a voice-to-text message system, according to the present invention.

FIG. 2 further illustrates the elements and processes of the voice-to-text message system 120. The illustrated voice-to-text message system 120 includes a voicemail repository 210, a text message repository 212, a speech recognition system 214, a speech synthesis system 216, and a dialog manager 218. The dialog manager 218 is responsible for recognizing the calling party's responses, replaying user selected portions of the voicemail message, and editing user selected portions of the voicemail message. The speech synthesis system 216 is responsible for converting text to voice and, the speech recognition system 214 is responsible for converting voice to text. The repositories 210, 212 are responsible for storing voicemail message and text messages, respectively.

The above systems 214, 216, manager 218, and repositories 210, 212 can each include hardware, software, or combinations thereof that may, alone or in combination, form the systems, manager and/or repositories for performing various processes of the present invention. For example, hardware components can include, but are not limited to, a processor and a memory. The processor can be, for example, a single-processor or a multiprocessor designed on a single or multi-processor die or on separate dice within the same system. A memory can be, for example, any available media accessed by another component (e.g., a processor) and includes, but is not limited to, volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital versatile disc (DVD) or other optical disk storage, magnetic tape, magnetic disk storage or other magnetic storage devices, or any other medium which can be used to store the desired information for the voice-to-text system 120. Moreover, the memory can include one or more relational, hierarchical, and/or network databases to manage and store relevant data.

Additionally, it should be understood that the term "repository" is used herein to broadly encompass any form of storage that is configured to store a voicemail message and/or text message for later use. The "repository" can be realized as a memory or a database stored within a memory. It is also contemplated that although the exemplary voice-to-text message system 120 includes two repositories, at least one repository may be used in alternative embodiments.

When a voicemail message is received from a calling party, it is stored in the voicemail repository 210. An example of the calling party's voicemail message could be, "Hey, Joe. Meet me at the office." The speech recognition system 214 converts the voicemail message to a text message and passes it to the text message repository 212 where it is stored. The stored text message may be "Hey< >joe< >meet me at the offer." If the calling party chooses to confirm the text message without hearing the converted message, the text message "Hey< >joe< >meet me at the offer" is sent to the SMSC 118 (FIG. 1) where it is stored and forwarded to the called party's device 104. However, if the calling party elects to review or edit the text message, the text message is sent to the speech synthesis system 216. The speech synthesis system 216 converts the text message to voice and routes it back to the voicemail repository 210 so it may be retrieved by the dialog manager 218 and presented to the calling party. The calling party will hear "Hey (pause) joe (pause) meet me at the offer" in this example. By way of example, and not limitation, "< >" and "(pause)" are textual representations of pauses in the text message and the voicemail message, respectively. If the calling party is satisfied with the conversion, the dialog manager 218 provides options to confirm or further edit the converted message. If the calling party confirms the converted message, the text message is at least temporarily stored in the text message repository and is sent to the SMSC 118, where it is stored and forwarded to the called (destination) party.

If a request to further edit is made by the calling party, the dialog manager 218 prompts the calling party to select which portion of the voicemail message to review and edit. The calling party has a choice of whether the entire voicemail message, an individual word, or a string of words is replayed. For example, the calling party may request that all words after the first pause be presented. The calling party would hear "joe (pause) meet me at the offer." By alternative example, the calling party may request the last 3 words be replayed. Accordingly, the dialog manager 218 would play "at the offer." By further alternative example, the calling party may request to hear the last word of the message, prompting the dialog manager 218 to play only the word "offer." Similarly, the calling party may edit the voicemail message by selecting any number of words in the message to replace. As a continuation of the present example, the calling party prompts the voicemail system to replace "offer" with "office" or replace "meet me at the offer" with "page Bob at the gym," or any other word, word string, or combination of words. The calling party may make the requests to review and edit the voicemail message using any means for editing, including, but not limited to, verbal edits or edits using a user interface, such as, a keyboard, keypad, mouse, scroll wheel, track ball, touch screen, touch pad, or any combination thereof, and the like.

The dialog manager 218 can continue to prompt the calling party to review and select portions of the converted voicemail message until the calling party is done editing. When the calling party is satisfied with the edited message, the voicemail message and the edits are stored in the voicemail repository 210 and routed back to the speech recognition system 214 to be converted to text. The resulting text message is stored in the text message repository 212 and not delivered until the calling party confirms the text message is ready to be sent.

Figure 3:
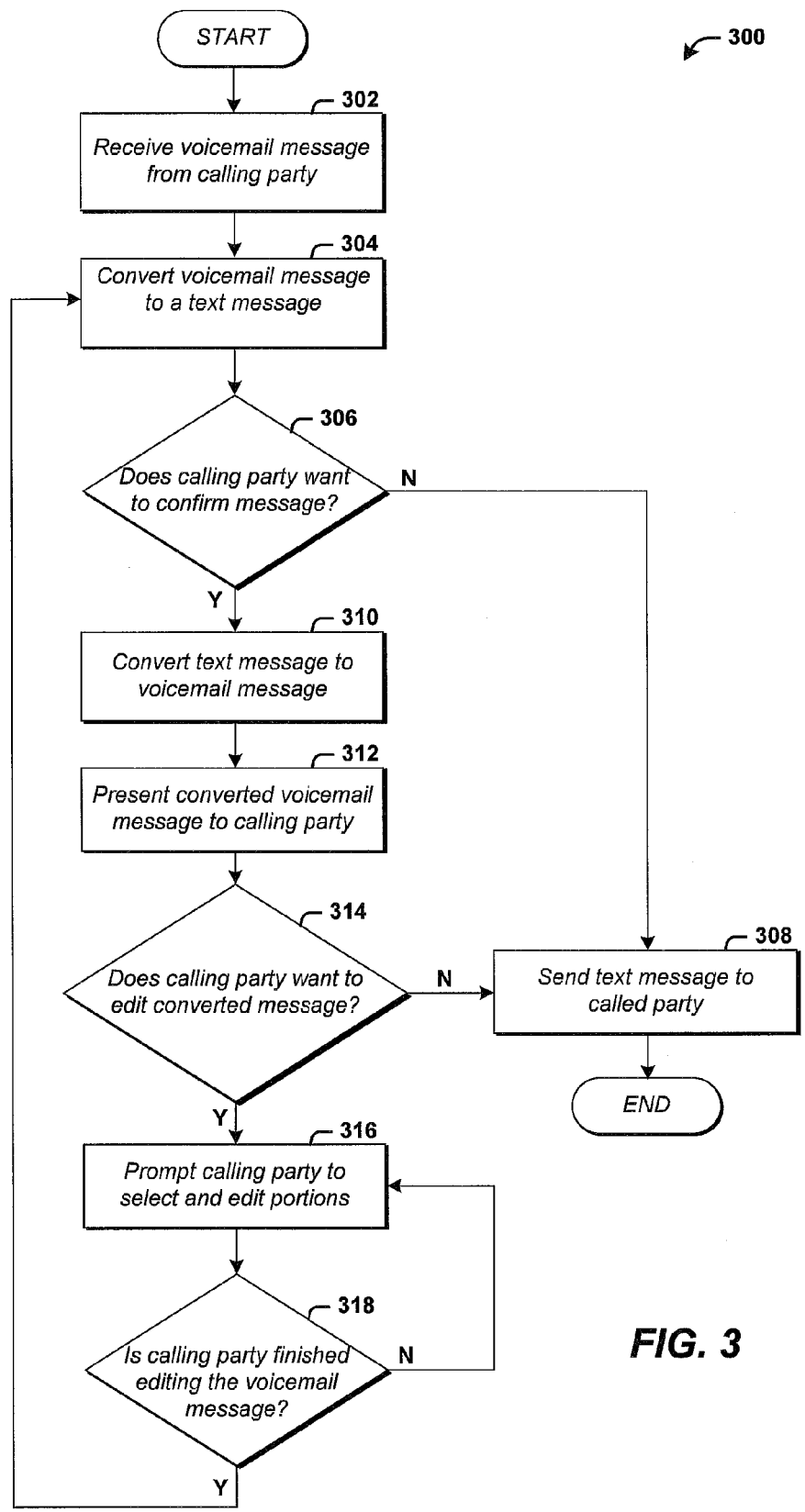
FIG. 3 is a flow chart illustrating an exemplary method for providing voicemail to text message conversion, according to the present invention.

Referring now to FIG. 3, a flowchart of an exemplary method 300 for operating the voice-to-text system 120 is illustrated, according to the present invention. The method 300 begins and proceeds to step 302, wherein the voice-to-text message system 120 receives a voicemail message from a calling party for a called party. The speech recognition system 214 (FIG. 2) converts the voicemail message to a text message at step 304. At step 306, the calling party is prompted to confirm the converted text message. If the calling party responds "No" to the confirmation, the text message is sent to the called party at step 308 and the method 300 ends. If, however, the calling party elects to confirm the text message, the text message is converted to a voice message at step 310. At step 312, a converted voicemail message is presented to the calling party for review. At step 314, the calling party is given the option again to confirm or edit the voicemail message. If the calling party elects not to edit the voicemail message, step 308 is followed and the text message is sent to the called party, after which the method 300 ends. If the calling party elects to edit the voicemail message, flow proceeds to step 316 and the dialog manager 218 (FIG. 2) directs the calling party to select portions of the voicemail message to review and edit. When the calling party has completed editing at step 318, the process starts again at step 304 where the edited voicemail message is converted to a text message. The calling party may choose to confirm the text message at step 306, before hearing the text to voice conversion, or at step 314, after hearing the text to voice conversion. The confirmation by the calling party at either step 306 or 314 permits the text message to be sent to the called party.

In an alternate embodiment, the confirmation by the calling party will cause the text message to be sent to the called party and a copy of the text message to be sent to the calling party. In another embodiment, the dialog manager allows the calling party to edit the voicemail message before it is converted by the speech recognition system. This functionality allows a calling party that knows the voicemail message is incorrect to make changes to the voicemail message before it is converted. As detailed above, the dialog manager 218 can prompt the calling party to select which portion of the voicemail message to review and edit. The calling party can still be provided a choice of whether the entire voicemail message, an individual word, or a string of words is replayed.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, for processing voicemail messages, comprising:
   receiving a first voicemail message from a calling party for transmission to a called party in text format;
   converting the first voicemail message to a first text message;
   converting the first text message to a second voicemail message;
   presenting the second voicemail message to the calling party;
   receiving a request to edit the second voicemail message;
   creating a second text message representing the second voicemail message edited in accordance with the request to edit the second voicemail message;
   converting the second text message to a third voicemail message;
   presenting at least a portion of the third voicemail message to the calling party;
   receiving, from the calling party, a confirmation of the third voicemail message or a request to edit the third voicemail message;
   in response to receiving the confirmation of the third voicemail message, sending the second text message to the called party; and
   sending a copy of the second text message to the calling party.

2. The method of claim 1, further comprising, in response to receiving the request to edit the third voicemail message, editing the third voicemail message to generate a fourth voicemail message, the fourth voicemail message comprising at least one portion of the third voicemail message that has been edited.

3. The method of claim 2, further comprising
   converting the fourth voicemail message to a third text message;
   converting the third text message to a fifth voicemail message;
   presenting at least a portion of the fifth voicemail message, corresponding to the portion of the third voicemail message that has been edited, to the calling party;

receiving, from the calling party, a confirmation of the fifth voicemail message or a request to edit the fifth voicemail message; and in response to receiving the confirmation of the fifth voicemail message, sending the third text message to the called party.

4. The method of claim 1, further comprising:

presenting the calling party with an option to send voicemail in text format;

wherein converting the first voicemail message to the first text message is performed in response to the calling party opting to send voicemail in text format.

5. The method of claim 1, further comprising:

presenting the calling party with an option of receiving the copy of the second text message;

wherein sending the copy of the second text message to the calling party is performed in response to the calling party opting to receive the copy.

6. The method of claim 1, further comprising receiving an edit, from the calling party, from a user interface selected from a group of user interfaces consisting of a keyboard, a keypad, a mouse, a scroll wheel, a track ball, a touch screen, and a touch pad.

7. A tangible computer-readable medium comprising computer-executable instructions that, when executed by a processor, cause the processor to, at least:

receive a first voicemail message from a calling party for transmission to a called party in text format;

initiate conversion of the first voicemail message to a first text message;

initiate conversion of the first text message to a second voicemail message;

present the second voicemail message to the calling party;

receive a request to edit the second voicemail message;

create a second text message representing the second voicemail message edited in accordance with the request to edit the second voicemail message;

initiate conversion of the second text message to a third voicemail message;

present at least a portion of the third voicemail message to the calling party;

receive, from the calling party, a confirmation of the third voicemail message or a request to edit the third voicemail message;

in response to receiving the confirmation of the third voicemail message, send the second text message to the called party; and send a copy of the second text message to the calling party.

8. The tangible computer-readable medium of claim 7, wherein the instructions further cause the processor to:

present the calling party with an option to send voicemail in text format;

wherein converting the first voicemail message to the first text message is performed in response to the calling party opting to send voicemail in text format.

9. The tangible computer-readable medium of claim 7, wherein the instructions further cause the processor to:

present the calling party with an option of receiving the copy of the second text message;

wherein sending the copy of the second text message to the calling party is performed in response to the calling party opting to receive the copy.

10. The tangible computer-readable medium of claim 7, wherein the instructions further cause the processor to receive an edit, from the calling party, from a user interface selected from a group of user interfaces consisting of a keyboard, a keypad, a mouse, a scroll wheel, a track ball, a touch screen, a touch pad.

11. The tangible computer-readable medium of claim 7, wherein the instructions further cause the processor to, in response to receiving the request to edit the third voicemail message, edit the third voicemail message to generate a fourth voicemail message, the fourth voicemail message including at least one portion of the third voicemail message that has been edited.

12. The tangible computer-readable medium of claim 11, wherein the instructions further cause the processor to:

initiate conversion of the fourth voicemail message to a third text message; and initiate conversion of the third text message to a fifth voicemail message.

13. The tangible computer-readable medium of claim 12, wherein the instructions further cause the processor to:

present at least a portion of the fifth voicemail message, corresponding to the portion of the third voicemail message that has been edited, to the calling party;

receive, from the calling party, a confirmation of the fifth voicemail message or a request to edit the fifth voicemail message; and in response to receiving the confirmation of the fifth voicemail message, send the third text message to the called party.

14. A voice-to-text messaging system comprising:

a repository for storing messages;

a speech recognition subsystem configured to convert voicemail messages to text messages;

a speech synthesis subsystem configured to convert text messages to voicemail; and a dialog manager configured to:

receive a first voicemail message from a calling party for transmission to a called party in text format;

initiate conversion of the first voicemail message to a first text message by the speech recognition subsystem;

initiate conversion of the first text message to a second voicemail message by the speech synthesis subsystem;

present the second voicemail message to the calling party;

receive a request to edit the second voicemail message;

create a second text message representing the second voicemail message edited in accordance with the request to edit the second voicemail message;

initiate conversion of the second text message to a third voicemail message by the speech synthesis subsystem;

present at least a portion of the third voicemail message to the calling party;

receive, from the calling party, a confirmation of the third voicemail message or a request to edit the third voicemail message;

in response to receiving the confirmation of the third voicemail message, send the second text message to the called party; and wherein the dialog manager is further configured to send a copy of the second text message to the calling party.

15. The system of claim 14, wherein the dialog manager is further configured to:

present the calling party with an option to send voicemail in text format;

wherein converting the first voicemail message to the first text message is performed in response to the calling party opting to send voicemail in text format.

16. The system of claim 14, wherein the dialog manager is further configured to:
   present the calling party with an option of receiving the copy of the second text message;
   wherein sending the copy of the second text message to the calling party is performed in response to the calling party opting to receive the copy.

17. The system of claim 14, wherein the dialog manager is further configured to receive an edit, from the calling party, from a user interface selected from a group of user interfaces consisting of a keyboard, a keypad, a mouse, a scroll wheel, a track ball, a touch screen, and a touch pad.

18. The system of claim 14, wherein the dialog manager is further configured to, in response to receiving the request to edit the third voicemail message, edit the third voicemail message to generate a fourth voicemail message, the fourth voicemail message including at least one portion of the third voicemail message that has been edited.

19. The system of claim 18, wherein the dialog manager is further configured to:
   initiate conversion of the fourth voicemail message to a third text message;
   initiate conversion of the third text message to a fifth voicemail message; and
   present at least a portion of the fifth voicemail message, corresponding to the portion of the third voicemail message that has been edited, to the calling party.

20. The system of claim 19, wherein the dialog manager is further configured to receive, from the calling party, one of a confirmation of the fifth voicemail message or a request to edit the fifth voicemail message; and in response to receiving the confirmation of the fifth voicemail message, send the third text message to the called party.

* * * * *